US012620520B2

(12) United States Patent
Wadekar et al.

(10) Patent No.: US 12,620,520 B2
(45) Date of Patent: May 5, 2026

(54) OVERLAPPED INDUCTOR STRUCTURE

(71) Applicant: Synopsys, Inc., Mountain View, CA (US)

(72) Inventors: Jayesh Wadekar, Pune (IN); Jayashankar Mv, Bangalore (IN); Jairaj Naik K R, Bangalore (IN); Atul Kabra, Pune (IN)

(73) Assignee: SYNOPSYS, INC., Mountain View, CA (US)

( * ) Notice: Subject to any disclaimer, the term of this patent is extended or adjusted under 35 U.S.C. 154(b) by 805 days.

(21) Appl. No.: 17/876,446

(22) Filed: Jul. 28, 2022

(65) Prior Publication Data

US 2023/0042967 A1 Feb. 9, 2023

(30) Foreign Application Priority Data

Aug. 3, 2021 (IN) ............................. 202141034894

(51) Int. Cl.
*H01F 27/28* (2006.01)
*H01F 27/00* (2006.01)

(52) U.S. Cl.
CPC ....... *H01F 27/2823* (2013.01); *H01F 27/006* (2013.01); *H01F 2027/2838* (2013.01)

(58) Field of Classification Search
CPC ............... H01F 27/006; H01F 27/2804; H01F 2027/2809
USPC ......................... 336/180, 192, 200, 232, 234
See application file for complete search history.

(56) References Cited

U.S. PATENT DOCUMENTS

| | | | | |
|---|---|---|---|---|
| 6,380,835 B1 * | 4/2002 | Lee | H01F 17/0013 | 336/200 |
| 6,759,937 B2 * | 7/2004 | Kyriazidou | H01L 23/5227 | 336/200 |
| 6,870,457 B2 * | 3/2005 | Chen | H10D 84/00 | 336/200 |
| 6,927,664 B2 * | 8/2005 | Nakatani | H01P 5/10 | 336/200 |
| 2006/0284718 A1 * | 12/2006 | Baumgartner | H01L 23/5227 | 336/223 |
| 2017/0117079 A1 * | 4/2017 | Yen | H01F 27/2804 | |
| 2017/0287623 A1 * | 10/2017 | Valentin | H01F 27/29 | |

* cited by examiner

*Primary Examiner* — Lincoln D Donovan
(74) *Attorney, Agent, or Firm* — PATTERSON + SHERIDAN, LLP

(57) ABSTRACT

An inductor structure includes a first inductor and a second inductor. A first portion of the first inductor is disposed on a first layer and a second portion of the first inductor is disposed on a second layer. A first portion of the second inductor is disposed on the first layer and a second portion of the second inductor is disposed on the second layer. The first portion of the first inductor and the second portion of the second inductor at least partially overlap. The second portion of the first inductor and the first portion of the second inductor at least partially overlap.

15 Claims, 4 Drawing Sheets

OVERLAPPED INDUCTOR STRUCTURE

RELATED APPLICATION

This application claims priority to and the benefit of Indian Provisional Patent Application Serial No. 202141034894, entitled "OVERLAPPED SYMMETRIC INDUCTOR STRUCTURE," filed Aug. 3, 2021, which is incorporated herein by reference in its entirety.

TECHNICAL FIELD

The present disclosure relates to an inductor structure, and more particularly, to an overlapped and symmetric inductor structure.

BACKGROUND

An inductor, also referred to as a coil, is a passive two-terminal component that stores energy in the form of a magnetic field when electric current flows through the inductor. Inductors are used in various devices such as transformers, amplifiers, and regulators. An inductor may be implemented using a coil of wire with one or more turns aimed to achieve a given inductance value.

SUMMARY

The present disclosure describes an inductor structure, a chip, and an amplifier. According to an embodiment, an inductor structure includes a first inductor and a second inductor. A first portion of the first inductor is disposed on a first layer and a second portion of the first inductor is disposed on a second layer. A first portion of the second inductor is disposed on the first layer and a second portion of the second inductor is disposed on the second layer. The first portion of the first inductor and the second portion of the second inductor at least partially overlap. The second portion of the first inductor and the first portion of the second inductor at least partially overlap.

A first end of the first inductor and a first end of the second inductor may be disposed on the first layer. A second end of the first inductor and a second end of the second inductor may be disposed on the second layer.

A coefficient of coupling for the first inductor and the second inductor may be positive.

An intervening layer may be positioned between the first layer and the second layer. The first inductor and the second inductor may transition between the first layer and the second layer using vias in the intervening layer.

The first inductor and the second inductor may include consecutive metals.

The first inductor and the second inductor may transition between the first layer and the second layer five times.

The first inductor may include two turns. The second inductor may include two turns.

According to another embodiment, a chip includes a first metal layer, a second metal layer, a first inductor, and a second inductor. A first portion of the first inductor is disposed on the first metal layer and a second portion of the first inductor is disposed on the second metal layer. A first portion of the second inductor is disposed on the first metal layer and a second portion of the second inductor is disposed on the second metal layer. The first portion of the first inductor and the second portion of the second inductor at least partially overlap. The second portion of the first inductor and the first portion of the second inductor at least partially overlap.

A first end of the first inductor and a first end of the second inductor may be disposed on the first metal layer. A second end of the first inductor and a second end of the second inductor may be disposed on the second metal layer.

A coefficient of coupling for the first inductor and the second inductor may be positive.

An intervening layer may be positioned between the first metal layer and the second metal layer. The first inductor and the second inductor may transition between the first metal layer and the second metal layer using vias in the intervening layer.

The first inductor and the second inductor may include consecutive metals.

The first inductor and the second inductor may transition between the first metal layer and the second metal layer five times.

The first inductor may include two turns. The second inductor may include two turns.

According to another embodiment, an amplifier includes a transimpedance amplifier, a first inductor electrically coupled to the transimpedance amplifier, and a second inductor electrically coupled to the transimpedance amplifier. A first portion of the first inductor is disposed on a first layer and a second portion of the first inductor is disposed on a second layer. A first portion of the second inductor is disposed on the first layer and a second portion of the second inductor is disposed on the second layer. The first portion of the first inductor and the second portion of the second inductor at least partially overlap. The second portion of the first inductor and the first portion of the second inductor at least partially overlap.

A first end of the first inductor and a first end of the second inductor may be disposed on the first layer. A second end of the first inductor and a second end of the second inductor may be disposed on the second layer.

A coefficient of coupling for the first inductor and the second inductor may be positive.

An intervening layer may be positioned between the first layer and the second layer. The first inductor and the second inductor may transition between the first layer and the second layer using vias in the intervening layer.

The first inductor and the second inductor may include consecutive metals.

The first inductor and the second inductor may transition between the first layer and the second layer five times.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

In applications such as transimpedance amplifiers, inductors (e.g., inductor pairs) may be used to extend bandwidth. Single-ended two-port inductor structures were used, but these inductor structures were quite large. Four-port interleaved inductor structures were developed, which reduced the area by 50% relative to the single-ended two-port inductor structures. However, the four-port interleaved inductors were typically asymmetric. The pins of the four-port interleaved inductors could be rearranged to provide symmetry, but this rearrangement results in opposing current flow directions in the inductors, which causes a negative mutual coupling coefficient between the inductors. Thus, the effective inductance of the inductors is reduced.

Aspects described herein relate to an inductor structure (e.g., a four-port differential, overlapped, fully symmetric inductor structure). In some embodiments, the inductor structure implements two inductors in a symmetrical manner, while also providing a reduction in inductor area by 50% as compared to existing implementations due to the overlapping of two coils to produce a single, four-port differential inductor structure. Generally, the inductors are disposed on two different layers (e.g., metal layers of a chip). Each of the inductors includes coils that transition between the two layers (e.g., from the first layer to the second layer or from the second layer to the first layer) at various points. The transitions result in portions of the inductors on the two layers to overlap each other.

The inductor structure provides several technical advantages. For example, the inductor structure provides symmetry and a positive mutual coupling coefficient. As a result, this design of the inductor structure allows for a reduction in size relative to existing designs, in certain embodiments. In some embodiments, the design of the inductor structure provides a 50% reduction in size relative to two-port inductor designs while providing a positive mutual coupling coefficient. Moreover, the positive mutual coupling coefficient between the two inductors may increase the effective inductance of the inductors.

Figure 1:
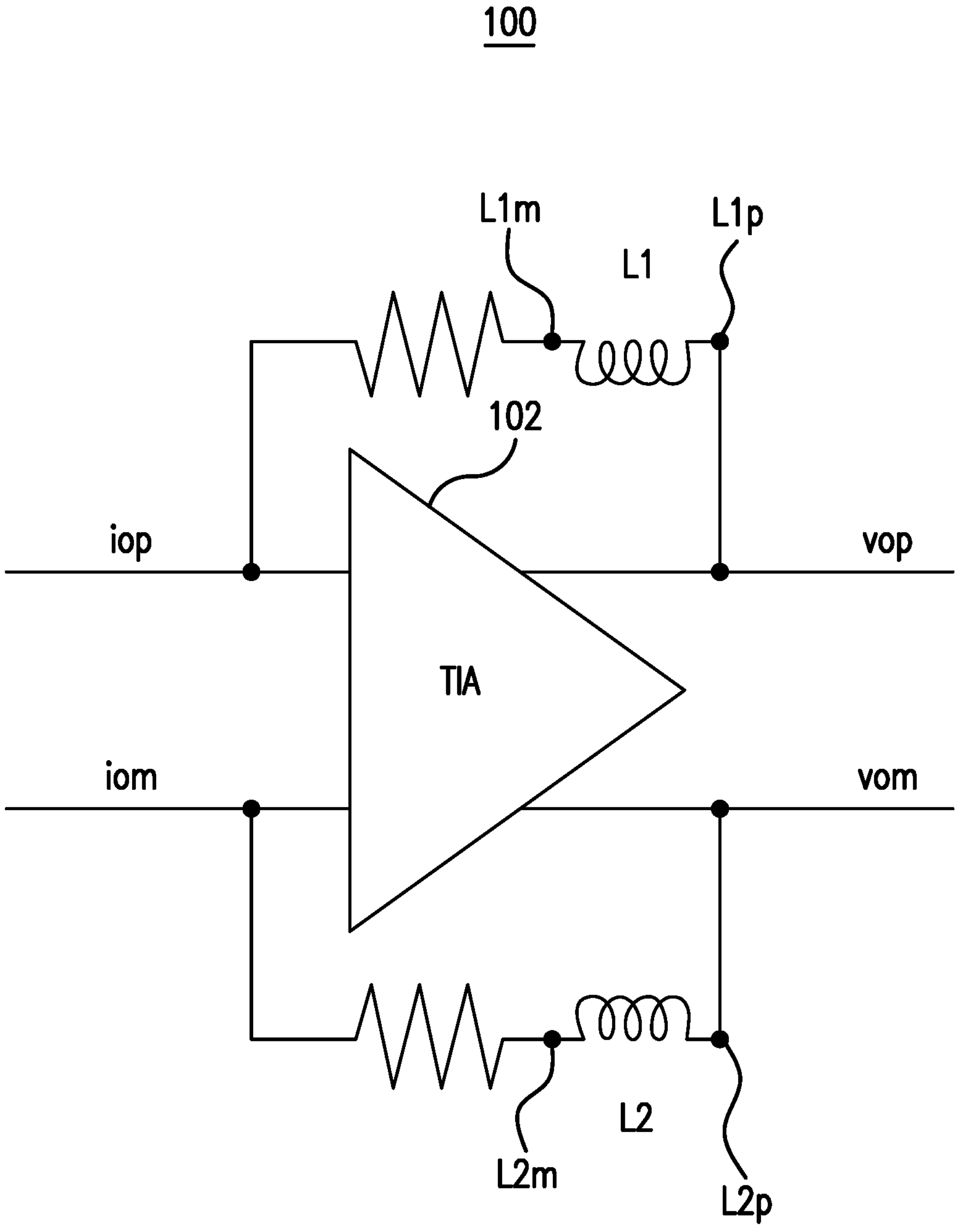
FIG. 1 illustrates an amplifier circuit that includes example inductors, in accordance with certain aspects of the present disclosure.

FIG. 1 illustrates an amplifier circuit 100. As seen in FIG. 1, the amplifier circuit 100 includes a transimpedance amplifier (TIA) 102, an inductor L1, and an inductor L2. The inductor L1 is coupled between a node L1*m* and a node L1*p*, and the inductor L2 is coupled between a node L2*m* and a node L2*p*.

The TIA 102 converts a current (e.g., provided to the inputs iop and iom of the TIA 102) to a voltage (e.g., at the outputs vop and vom of the TIA 102). As shown in FIG. 1, a resistor and the inductor L1 are coupled in series between the input iop and the output vop, and a resistor and the inductor L2 are coupled in series between the input iom and the output vom. In existing TIA applications, single ended two-port inductor structures are used (e.g., to implement the inductor L1 and the inductor L2) for the purpose of bandwidth extension. In some cases, a four-port interleaved inductor may be used, which reduces the area consumed by the inductors by 50%. However, conventional interleaved structures are asymmetric by design. In some implementations, the four port pins of the interleaved structure can be arranged to make a symmetric structure, but due to opposing current flow directions in the inductors, a negative coupling coefficient may result, reducing the effective inductance of the inductive elements.

The effective inductance (Leff) of two parallel equal inductors having mutual inductance (M) and mutual coupling coefficient (k) may be calculated using the equation:

$$Leff = (L + M)/2 \text{ where}$$

L is the self-inductance of the individual inductors and M is equal to the multiplicative product of k and L.

When two or more inductors are magnetically linked by a common magnetic flux, they are said to have the property of mutual inductance. The amount of inductive coupling that exists between the two inductors is expressed as a fractional number (e.g., a mutual coupling coefficient) with a magnitude between zero and one. A mutual coupling coefficient of zero indicates no inductive coupling, and a mutual coupling coefficient of one indicates full or maximum inductive coupling. The value of the mutual coupling coefficient is positive if the signals in the inductors move in the same direction. The value of the mutual coupling coefficient is negative and leads to a reduction in Leff, if the signals are moving in opposite directions. The aspects of the present disclosure provide a structure that maintains symmetry of the inductors while providing a positive mutual coupling coefficient, and hence, a reduction in the overall area for the same effective inductance value.

Figure 2A:
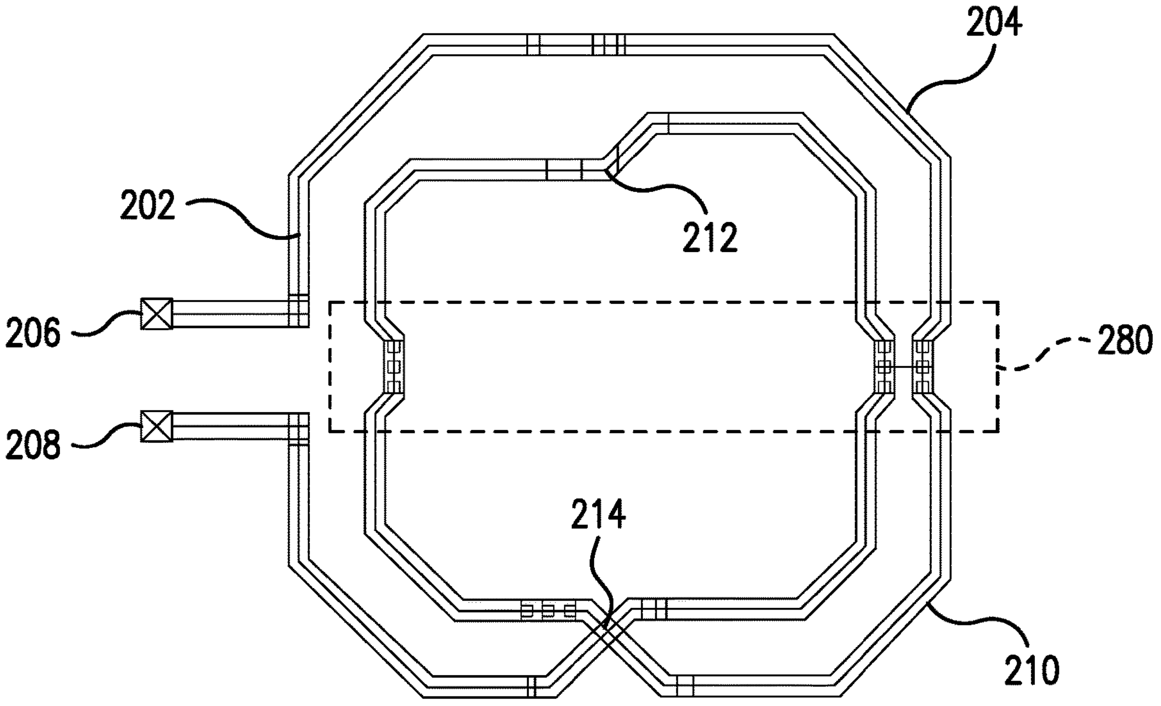
FIGS. 2A and 2B illustrate example inductor, in accordance with certain aspects of the present disclosure.

FIG. 2A is a top view of an inductor 202. As seen in FIG. 2A, the inductor 202 is formed using one or more wires 204 that begin at an end 206 and terminate at an end 208. The one or more wires 204 bend to form a coil with two turns 210 and 212. The turn 212 is generally formed in the interior of the turn 210. The one or more wires 204 cross over themselves at the point 214 to transition between the turn 210 and the turn 212. The inductor 202 may be used as the inductor L1 in the example of FIG. 1.

Figure 2B:
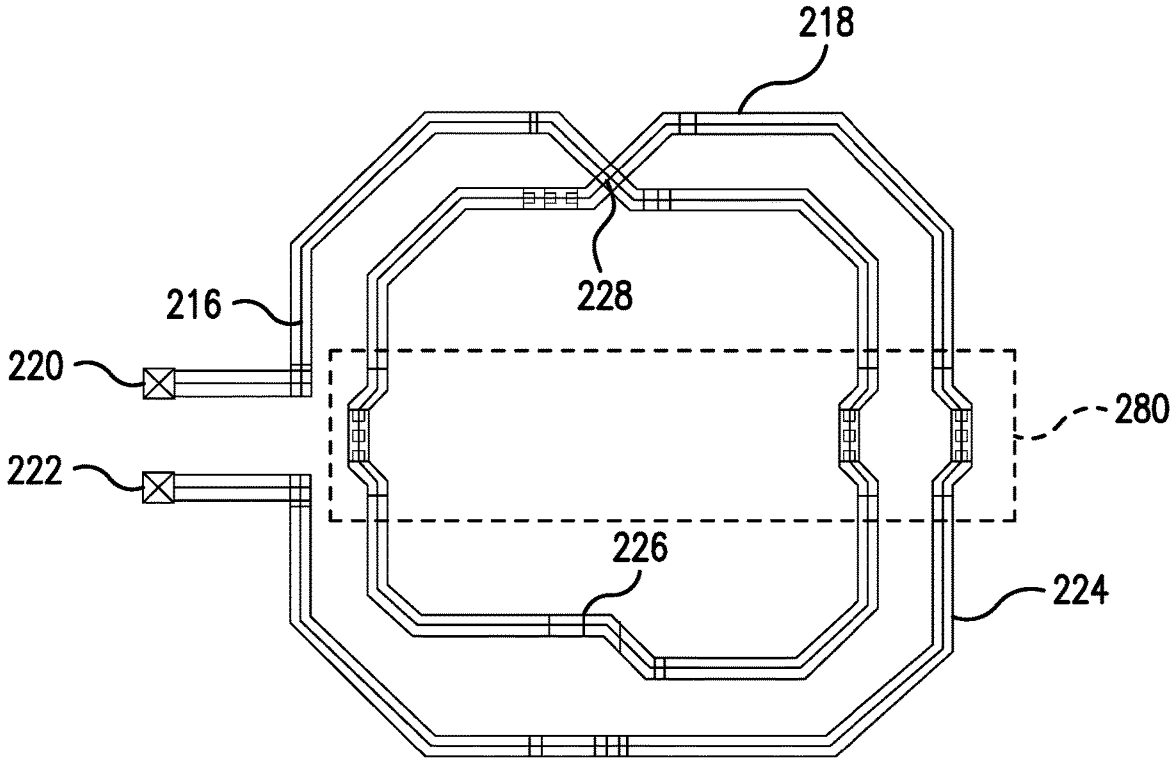

FIG. 2B is a top view of an inductor 216. As seen in FIG. 2B, the inductor 215 is formed using one or more wires 218 that begin at an end 220 and terminate at an end 222. The one or more wires 218 bend to form a coil with two turns 224 and 226. The turn 226 is generally formed in the interior of the turn 224. The one or more wires 218 cross over themselves at the point 228 to transition between the turn 224 and the turn 226. The inductor 216 may be used as the inductor L2 in the example of FIG. 1.

The inductor 202 and the inductor 216 may form a four-port inductor structure. The inductor 202 and the inductor 216 may be positioned such that portions of the inductor 202 overlap with portions of the inductor 216. As seen in FIGS. 2A and 2B, the inductor 202 and the inductor 216 are mirror images of each other except in the region 280. From a top view, at least a portion of the inductor 202 shown in FIG. 2A is a mirror image of at least a portion of the inductor 216 shown in FIG. 2B. For example, with the exception of the portions of the inductors 202 and 216 in the regions 280, the inductor 202 is the same as the inductor 216 when rotated 180 degrees about its horizontal midline, and vice versa.

Figure 3A:
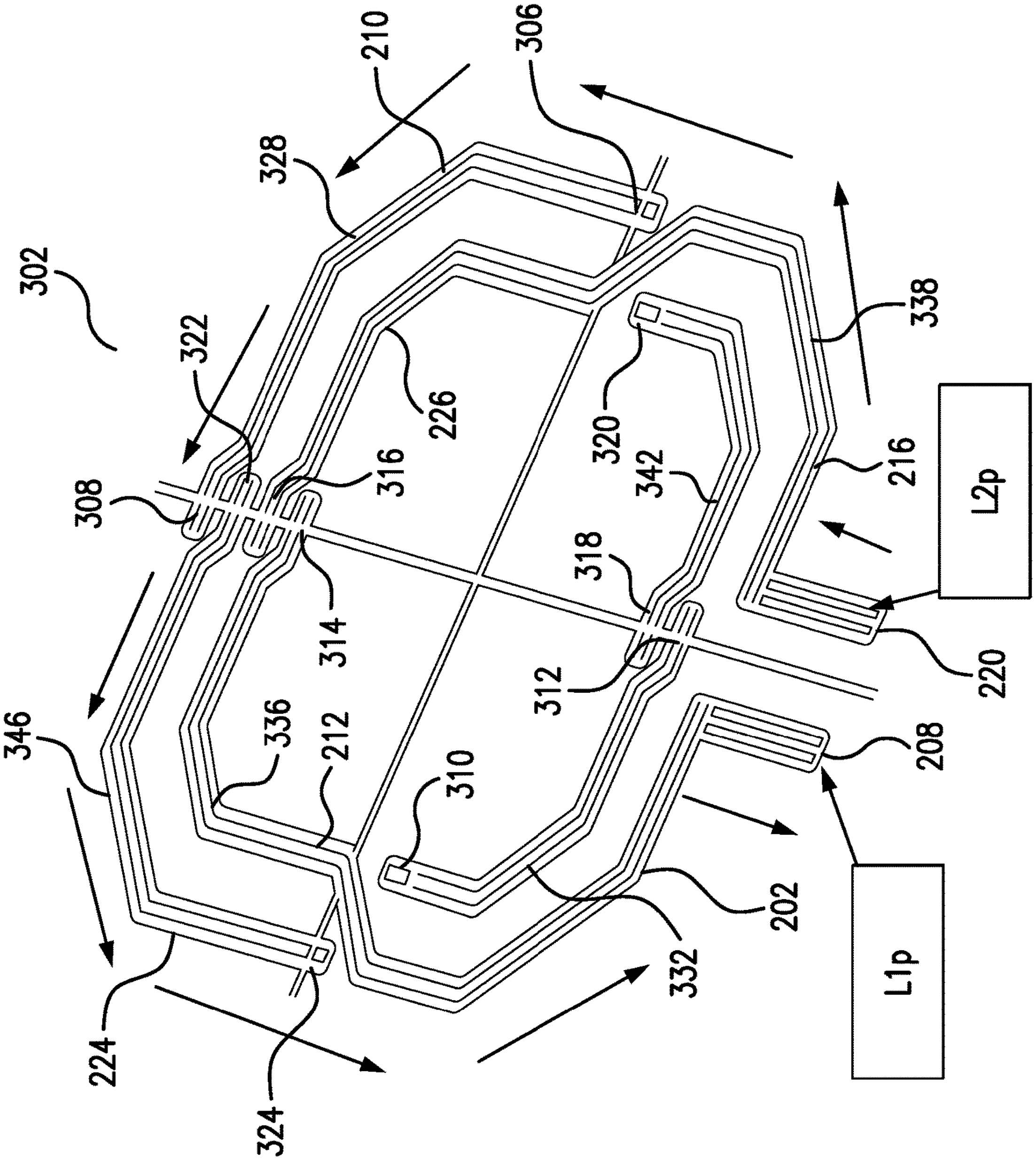
FIGS. 3A and 3B illustrate an inductor structure formed using the inductors of FIGS. 2A and 2B, in accordance with certain aspects of the present disclosure.
Figure 3B:
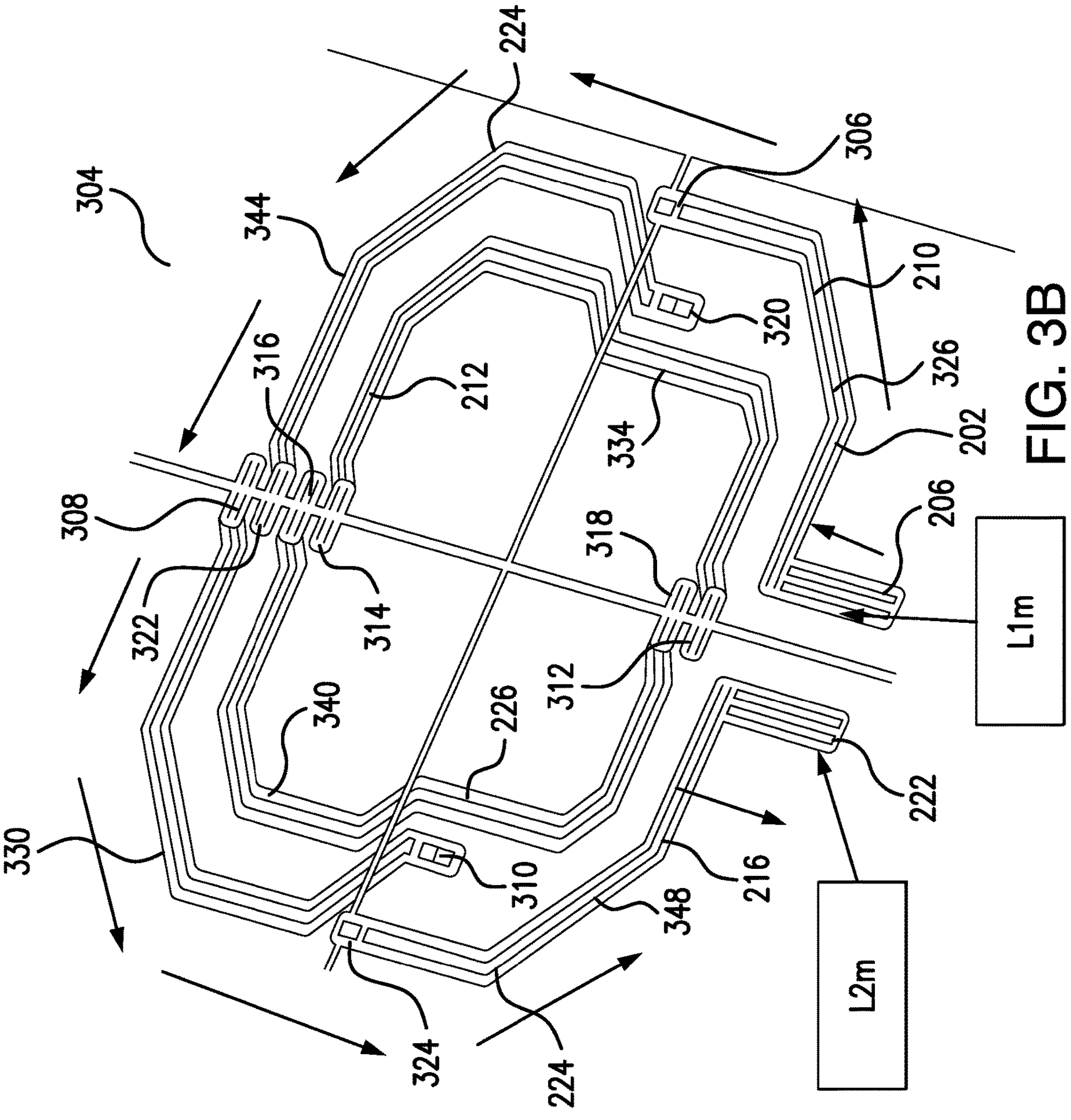

FIGS. 3A and 3B, taken together, illustrate the inductor 202 (which can be used to implement the inductor L1 in the example of FIG. 1) and the inductor 216 (which can be used to implement the inductor L2 in the example of FIG. 1). Generally, FIG. 3A shows the portions of the inductors 202 and 216 implemented on a layer 302 of a chip (e.g., a metal layer of the chip), and FIG. 3B shows the portions of the inductors 202 and 216 implemented on a layer 304 of the chip (e.g., another metal layer of the chip). The layers 302 and 304 may be arranged (e.g., stacked) such that portions of the inductors 202 and 216 vertically overlap with each other. For example, the layer 302 may be arranged above or on top of the layer 304 such that the end 208 overlaps with the end 222 and such that the end 220 overlaps with the end 206.

The inductor 202 and the inductor 216 are formed on both the layer 302 and the layer 304. The inductors 202 and 216 transition between the layer 302 and the layer 304 at nodes 306, 308, 310, 312, 314, 316, 318, 320, 322, and 324. For example, the inductors 202 and 216 may extend through holes at these nodes 306, 308, 310, 312, 314, 316, 318, 320, 322, and 324 to transition between the layer 302 and the layer 304. As another example, vias may be positioned at these nodes 306, 308, 310, 312, 314, 316, 318, 320, 322, and 324 to provide connections between the layer 302 and the layer 304.

Although the example of FIGS. 3A and 3B show the inductors 202 and 216 each transitioning between the layer 302 and the layer 304 five times, the inductors 202 and 216 may transition between the layers 302 and 304 fewer than five times or more than five times.

As shown, the outer turn 210 of the inductor 202 transitions between the layer 302 and the layer 304 at 90 degree positions (relative to the end 206/L1*m* or the end 208/L1*p* as the zero degree position), and the inner turn 212 of the inductor 202 transitions between the layer 302 and the layer 304 at the 180 degree positions (relative to the end 206/L1*m* or the end 208/L1*p* as the zero degree position). The outer turn 224 of the inductor 216 transitions between the layer 302 and the layer 304 at 90 degree positions (relative to the end 220/L2*p* or the end 222/L2*m* as the zero degree position), and the inner turn 226 of the inductor 216 transitions between the layer 302 and the layer 304 at the 180 degree positions (relative to the end 220/L2*p* or the end 222/L2*m* as the zero degree position).

The inductor 202 begins on the layer 304 with a portion 326 that extends from the end 206 to the node 306. The inductor 202 transitions to the layer 302 at the node 306. A portion 328 of the inductor 202 extends from the node 306 to the node 308 on the layer 302. The inductor 202 transitions to the layer 304 at the node 308. A portion 330 of the inductor 202 extends from the node 308 to the node 310 on the layer 304. The inductor 202 transitions to the layer 302 at the node 310. A portion 332 of the inductor 202 extends from the node 310 to the node 312 on the layer 302. The inductor 202 transitions to the layer 304 at the node 312. A portion 334 of the inductor 202 extends from the node 312 to the node 314 on the layer 304. The inductor 202 transitions to the layer 302 at the node 314. A portion 336 of the inductor 202 extends from the node 314 to the end 208 on the layer 302.

The inductor 216 begins on the layer 302 with a portion 338 that extends from the end 220 to the node 316. The inductor 216 transitions to the layer 304 at the node 316. A portion 340 of the inductor 216 extends from the node 316 to the node 318 on the layer 304. The inductor 216 transitions to the layer 302 at the node 318. A portion 342 of the inductor 216 extends from the node 318 to the node 320 on the layer 302. The inductor 216 transitions to the layer 304 at the node 320. A portion 344 of the inductor 216 extends from the node 320 to the node 322 on the layer 304. The inductor 216 transitions to the layer 302 at the node 322. A portion 346 of the inductor 216 extends from the node 322 to the node 324 on the layer 302. The inductor 216 transitions to the layer 304 at the node 324. A portion 348 of the inductor 216 extends from the node 324 to the end 222 on the layer 304.

Notably, when the layer 302 is arranged above the layer 304 or when the layer 304 is arranged above the layer 302, portions of the inductor 202 will overlap portions of the inductor 216, and vice versa. For example, if the layer 302 is arranged above the layer 304, the portion 338 of the inductor 216 overlaps the portions 326 and 334 of the inductor 202. The portion 342 of the inductor 216 overlaps the portion 334 of the inductor 202. The portion 328 of the inductor 202 overlaps the portion 344 of the inductor 216. The portion 346 of the inductor 216 overlaps the portion 330 of the inductor 202. The portion 336 of the inductor 202 overlaps the portions 340 and 348 of the inductor 216. The portion 332 of the inductor 202 overlaps the portion 340 of the inductor 216. Because of these overlaps, the inductors 202 and 216 are parallel inductors with a mutual inductance.

As seen in FIGS. 3A and 3B, the direction of electric current in the inductor 202 is the same as the direction of electric current in the inductor 216. As a result of the electric current in the inductors 202 and 216 flowing in the same direction, the inductors 202 and 216 have a positive mutual coupling coefficient. In some embodiments, the areas of the inductors 202 and 216 is reduced as a result of the positive mutual coupling coefficient.

In some embodiments, one or more intervening layers (not illustrated) are positioned between the layer 302 and the layer 304. Vias at the nodes 306, 308, 310, 312, 314, 316, 318, 320, 322, and 324 allow the inductors 202 and 216 to transition between the layer 302 and the layer 304 through the intervening layer.

In some embodiments, to implement the inductors 202 and 216 in a matched/symmetrical manner, both the inductors 202 and 216 use the same thickness of metals (traces) and are designed using two consecutive metals (e.g., metals with similar properties may be used to obtain matching between the two inductors 202 and 216). To match the environment, the metals transition between layers 302 and 304 at 90 positions, as described. In order to show the symmetricity of the inductors 202 and 216, images of both the inductors 202 and 216 are shown in FIGS. 2A, 2B, 3A, and 3B. As shown, both the inductors 202 and 216 have same type of routing pattern, thus helping to obtain symmetrical inductors 202 and 216.

Conventionally, in applications such as high-speed equalizers, differential single ended two-port inductor structures are used for the purpose of bandwidth extension. In layout, these two single-ended inductors are implemented separately. In some aspects, to save area, a four-port interleaved inductor is used which reduces area consumption by about 50%. The area required by two single-ended two-port inductors has been reduced to half as it has been replaced by a single four-port differential and symmetrically overlayed on-chip inductor structure. The four-port inductor structure includes fully matched symmetrical inductors, which have been designed by taking advantage of the mutual coupling between the inductors.

Reduction in the size of each inductor is caused by positive mutual coupling between the inductors. The aspects described herein provide inductors that are overlaid on top of each other. The current direction in both the inductors is the same, and as a result, the inductors have a positive mutual coupling coefficient value. Due to positive mutual coupling coefficient value, to get the same overall inductance value (Leff) as compared to conventional implementations, the value of the inductance (L) of each individual inductor reduces, thus helping to reduce the area of each inductor and the overall design. The lower inductance values for each inductor provides a higher self-resonating frequency (SRF) for each inductor. The equation for SRF is given by:

$$SRF(\text{Hz}) = \left(1/(2^{*}3.142)^{*}(L^{*}Cp)^{\wedge}0.5\right)$$

where L is the inductance of the inductor and Cp is the parasitic capacitance associated with the routing of the inductors.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. An inductor structure comprising:

a first inductor, wherein a first portion of the first inductor is disposed on a first layer and a second portion of the first inductor is disposed on a second layer; and a second inductor, wherein a first portion of the second inductor is disposed on the first layer and a second portion of the second inductor is disposed on the second layer, wherein the first portion of the first inductor and the second portion of the second inductor at least partially overlap, wherein a first current in the first portion of the first inductor and a second current in the second portion of the second inductor have a same direction, wherein a first end of the first inductor and a first end of the second inductor are disposed on the first layer, wherein a second end of the first inductor and a second end of the second inductor are disposed on the second layer, wherein the first end of the first inductor at least partially overlaps the second end of the second inductor, wherein the first end of the second inductor at least partially overlaps the second end of the first inductor, and wherein the second portion of the first inductor and the first portion of the second inductor at least partially overlap.

2. The inductor structure of claim 1, wherein a coefficient of coupling for the first inductor and the second inductor is positive.

3. The inductor structure of claim 1, wherein an intervening layer is positioned between the first layer and the second layer, and wherein the first inductor and the second inductor transition between the first layer and the second layer using vias in the intervening layer.

4. The inductor structure of claim 1, wherein the first inductor and the second inductor transition between the first layer and the second layer five times.

5. The inductor structure of claim 1, wherein the first inductor comprises two turns, and wherein the second inductor comprises two turns.

6. A chip comprising:

a first metal layer;

a second metal layer;

a first inductor, wherein a first portion of the first inductor is disposed on the first metal layer and a second portion of the first inductor is disposed on the second metal layer; and a second inductor, wherein a first portion of the second inductor is disposed on the first metal layer and a second portion of the second inductor is disposed on the second metal layer, wherein the first portion of the first inductor and the second portion of the second inductor at least partially overlap, wherein a first current in the first portion of the first inductor and a second current in the second portion of the second inductor have a same direction, wherein a first end of the first inductor and a first end of the second inductor are disposed on the first metal layer, wherein a second end of the first inductor and a second end of the second inductor are disposed on the second metal layer, wherein the first end of the first inductor at least partially overlaps the second end of the second inductor, wherein the first end of the second inductor at least partially overlaps the second end of the first inductor, and wherein the second portion of the first inductor and the first portion of the second inductor at least partially overlap.

7. The chip of claim 6, wherein a coefficient of coupling for the first inductor and the second inductor is positive.

8. The chip of claim 6, wherein an intervening layer is positioned between the first metal layer and the second metal layer, and wherein the first inductor and the second inductor transition between the first metal layer and the second metal layer using vias in the intervening layer.

9. The chip of claim 6, wherein the first inductor and the second inductor transition between the first metal layer and the second metal layer five times.

10. The chip of claim 6, wherein the first inductor comprises two turns, and wherein the second inductor comprises two turns.

11. An amplifier circuit comprising:

a transimpedance amplifier;

a first inductor electrically coupled to the transimpedance amplifier, wherein a first portion of the first inductor is disposed on a first layer and a second portion of the first inductor is disposed on a second layer; and a second inductor electrically coupled to the transimpedance amplifier, wherein a first portion of the second inductor is disposed on the first layer and a second portion of the second inductor is disposed on the second layer, wherein the first portion of the first inductor and the second portion of the second inductor at least partially overlap, wherein a first current in the first portion of the first inductor and a second current in the second portion of the second inductor have a same direction, wherein a first end of the first inductor and a first end of the second inductor are disposed on the first layer, wherein a second end of the first inductor and a second end of the second inductor are disposed on the second layer, wherein the first end of the first inductor at least partially overlaps the second end of the second inductor, wherein the first end of the second inductor at least partially overlaps the second end of the first inductor, and wherein the second portion of the first inductor and the first portion of the second inductor at least partially overlap.

12. The amplifier circuit of claim 11, wherein a coefficient of coupling for the first inductor and the second inductor is positive.

13. The amplifier circuit of claim 11, wherein an intervening layer is positioned between the first layer and the second layer, and wherein the first inductor and the second inductor transition between the first layer and the second layer using vias in the intervening layer.

14. The amplifier circuit of claim 11, wherein the first inductor and the second inductor comprise consecutive metals.

15. The amplifier circuit of claim 11, wherein the first inductor and the second inductor transition between the first layer and the second layer five times.

* * * * *